(12) United States Patent
Tomita et al.

(10) Patent No.: US 11,260,719 B2
(45) Date of Patent: Mar. 1, 2022

(54) BATTERY COOLING SYSTEM INCLUDING A COOLING WATER CIRCULATION CIRCUIT

(71) Applicant: TOYOTA JIDOSHA KABUSHIKI KAISHA, Toyota (JP)

(72) Inventors: Mitsuaki Tomita, Susono (JP); Tsuyoshi Koga, Gotemba (JP); Yusuke Suzuki, Nagakute (JP); Masaya Kaji, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 16/718,983

(22) Filed: Dec. 18, 2019

(65) Prior Publication Data

US 2020/0215871 A1 Jul. 9, 2020

(30) Foreign Application Priority Data

Jan. 8, 2019 (JP) .............................. JP2019-001296

(51) Int. Cl.
*B60H 1/00* (2006.01)
*B60H 1/26* (2006.01)
*B60H 1/32* (2006.01)

(52) U.S. Cl.
CPC ..... *B60H 1/00278* (2013.01); *B60H 1/00328* (2013.01); *B60H 1/00342* (2013.01); *B60H 1/00885* (2013.01); *B60H 1/26* (2013.01); *B60H 1/323* (2013.01); *B60H 1/3204* (2013.01); *B60H 1/3228* (2019.05); *B60H 2001/003* (2013.01);

(Continued)

(58) Field of Classification Search
CPC .. B60H 1/00278; B60H 1/323; B60H 1/3228; B60H 1/00885; B60H 1/3204; B60H 1/00328; B60H 1/26; B60H 1/00342; B60H 2001/003; B60H 2001/00928; B60H 2001/00307; H01M 10/613; H01M 10/625; H01M 10/6556; H01M 10/6563; H01M 10/6567; Y02E 60/10; Y02T 90/14; Y02T 10/7072; Y02T 10/70
See application file for complete search history.

(56) References Cited

U.S. PATENT DOCUMENTS 4,572,746 A * 2/1986 Wegner .................. H01M 4/22
    134/10
6,138,466 A * 10/2000 Lake .................. H01M 10/6568
    62/199

(Continued)

FOREIGN PATENT DOCUMENTS

JP    2014-037180 A    2/2014
JP    2017-106367 A    6/2017

*Primary Examiner* — Ljiljana V. Ciric
(74) *Attorney, Agent, or Firm* — Sughrue Mion, PLLC (57) ABSTRACT

A battery cooling system includes a cooling water circulation circuit for circulating cooling water for cooling the battery, a first heat exchanger for exchanging heat between air and cooling water, a second heat exchanger for exchanging heat between the low-pressure refrigerant of the refrigeration cycle circuit and cooling water, and an ion exchanger for removing impurity ions contained in the cooling water. The first heat exchanger and the second heat exchanger are arranged in series in the cooling water circulation circuit. The ion exchanger is disposed on the downstream side of the second heat exchanger in the cooling water circulation circuit.

7 Claims, 9 Drawing Sheets

(52) U.S. Cl.
CPC .............. *B60H 2001/00307* (2013.01); *B60H 2001/00928* (2013.01)

(56) References Cited

U.S. PATENT DOCUMENTS

| | | | | |
|---|---|---|---|---|
| 7,940,028 | B1* | 5/2011 | Hermann | B60L 53/14 320/151 |
| 8,449,997 | B2* | 5/2013 | Hermann | H01M 10/0525 429/9 |
| 9,083,019 | B2* | 7/2015 | Perry | H01M 8/04029 |
| 9,136,549 | B2* | 9/2015 | Vollmer | H01M 10/6569 |
| 2008/0311453 | A1* | 12/2008 | Kobayashi | H01M 8/04626 429/404 |
| 2012/0040210 | A1* | 2/2012 | Hermann | B60L 58/20 429/9 |
| 2012/0321920 | A1* | 12/2012 | Perry | H01M 8/04276 429/51 |
| 2013/0022888 | A1* | 1/2013 | Vollmer | H01M 10/6568 429/434 |
| 2015/0072192 | A1* | 3/2015 | Suppes | H01M 10/052 429/70 |
| 2015/0217623 | A1 | 8/2015 | Hatakeyama et al. | |
| 2015/0345839 | A1* | 12/2015 | Wang | B01J 20/041 62/238.3 |
| 2018/0287171 | A1* | 10/2018 | Oya | H01M 8/04656 |
| 2019/0046945 | A1* | 2/2019 | Murahara | C25B 15/08 |
| 2019/0047365 | A1* | 2/2019 | Sonnekalb | B60H 1/00385 |
| 2019/0193512 | A1* | 6/2019 | Wang | B60H 1/22 |
| 2019/0299790 | A1* | 10/2019 | Smith | B60L 53/11 |
| 2020/0099070 | A1* | 3/2020 | Takagaki | H01M 8/04731 |
| 2021/0091391 | A1* | 3/2021 | Oya | H01M 8/04953 |
| 2021/0296716 | A1* | 9/2021 | Zhamu | H01M 10/653 |
| 2021/0305639 | A1* | 9/2021 | Zhamu | H01M 10/653 |

* cited by examiner

SPORTS DRIVING MODE

BATTERY COOLING SYSTEM INCLUDING A COOLING WATER CIRCULATION CIRCUIT

CROSS-REFERENCE TO RELATED APPLICATION

The present application claims priority under 35 U.S.C. § 119 to Japanese Patent Application No. 2019-001296, filed Jan. 8, 2019. The contents of this application are incorporated herein by reference in their entirety.

FIELD

The present application is based on, and claims priority from, Japanese Patent Application Serial Number 2019-001296, filed on Jan. 8, 2019, the disclosure of which is hereby incorporated by reference herein in its entirety.

BACKGROUND

Japanese Patent Application Laid-Open No. 2014-037180 discloses a technique related to a thermal management system for managing the temperature of a battery during charging. The heat management system includes an air conditioner refrigerant loop in which an air conditioner refrigerant circulates, and a battery refrigerant loop in which a battery refrigerant circulates to a battery, an evaporator, and a heater. When the temperature of the battery refrigerant is higher than the target temperature while the battery is being charged, the system circulates the air conditioner refrigerant to absorb heat from the battery refrigerant in the evaporator. Japanese Patent Application Laid-Open No. 2017-106367 discloses a cooling system for a vehicle for cooling and dehumidifying air blown into a vehicle interior while cooling intake air of an engine.

SUMMARY

As the output of the battery mounted on the vehicle increases, the heat generation amount also increases. Therefore, if a battery cooling system is constructed to cover the cooling performance at the maximum heat generation amount that can be generated in the battery, the system becomes large in size. In a battery cooling system targeting a battery having a large output, it is desirable to take measures against leakage of cooling water. As a countermeasure against such leakage, it is generally known to use cooling water having a high insulating performance called "insulating LLC". Since insulating performance of insulating LLC is deteriorated by thermal degradation due to use, it is necessary to incorporate a device for recovering the insulating performance into a system. As described above, in the battery cooling system of a vehicle in which a battery having a large output is mounted, it is desired to construct a technology for suppressing the increase in size while enhancing the safety and cooling performance of the system.

The present disclosure has been made in view of the above-mentioned problems, and an object thereof is to provide a battery cooling system for cooling a battery mounted on a vehicle, which can suppress an increase in size while enhancing safety and cooling performance of the system.

In order to solve the above problems, a first disclosure is applied to a battery cooling system for cooling a battery mounted on a vehicle. The battery cooling system includes a cooling water circulation circuit for circulating cooling water for cooling the battery, a first heat exchanger for exchanging heat between air and the cooling water, a second heat exchanger for exchanging heat between low-pressure refrigerant of a refrigeration cycle circuit and the cooling water, and an ion exchanger for removing impurity ions contained in the cooling water. The first heat exchanger and the second heat exchanger are arranged in series in the cooling water circulation circuit. The ion exchanger is disposed downstream of the second heat exchanger in the cooling water circulation circuit.

A second disclosure has the following further features in the first disclosure.

The second heat exchanger is disposed downstream of the first heat exchanger in the cooling water circulation circuit.

A third disclosure has the following further features in the first disclosure.

The first heat exchanger is disposed downstream of the second heat exchanger in the cooling water circulation circuit. The ion exchanger is disposed downstream of the first heat exchanger in the cooling water circulation circuit.

A fourth disclosure has the following further features in the first disclosure.

The first heat exchanger is disposed downstream of the second heat exchanger in the cooling water circulation circuit. The ion exchanger is disposed upstream of the first heat exchanger in the cooling water circulation circuit.

A fifth disclosure has the following further features in any one of the first to fourth disclosures.

The refrigeration cycle circuit includes a first flow path form for circulating the low-pressure refrigerant to a heat exchanger for air conditioning of the vehicle, a second flow path form for circulating the low-pressure refrigerant to the second heat exchanger, and a switching mechanism for switching between the first flow path form and the second flow path form according to a correlation value correlated with a temperature of the battery.

A sixth disclosure has the following further features in any one of the first to fifth disclosures.

The first heat exchanger is disposed so as to face a traveling direction of the vehicle in a space extending from a rear wheel of the vehicle to a front side of the traveling direction. The ion exchanger is disposed downstream of the first heat exchanger in the cooling water circulation circuit.

In order to solve the above-mentioned problems, a seventh disclosure is applied to a battery cooling system for cooling a battery mounted on a vehicle. The battery cooling system includes a cooling water circulation circuit for circulating cooling water for cooling the battery, a first heat exchanger for exchanging heat between air and the cooling water, a second heat exchanger for exchanging heat between low-pressure refrigerant of a refrigeration cycle and the cooling water, and an ion exchanger for removing impurity ions contained in the cooling water. The first heat exchanger and the second heat exchanger are arranged in series in the cooling water circulation circuit. The second heat exchanger is arranged downstream of the first heat exchanger in the cooling water circulation circuit. The ion exchanger is disposed in a branch passage branched from the cooling water circulation circuit between the first heat exchanger and the second heat exchanger. The cooling water circulation circuit includes a cooling water switching mechanism for switching a flow destination of the cooling water flowing from the first heat exchanger between the second heat exchanger and the ion exchanger in accordance with a temperature of the cooling water flowing through the first heat exchanger.

According to the first disclosure, the first heat exchanger for exchanging heat with air and cooling water, and the second heat exchanger for exchanging heat with low-pressure refrigerant in the refrigeration cycle circuit and cooling water are arranged in series in the cooling water circulation circuit. As a result, the cooling water for cooling the battery can be cooled using both the first heat exchanger and the second heat exchanger, so that the cooling performance can be enhanced while suppressing the increase in size of the first heat exchanger. According to the first disclosure, the ion exchanger for removing impurity ions contained in the cooling water is disposed on the downstream side of the second heat exchanger. According to such a configuration, the cooling water after being cooled using the low-pressure refrigerant of the refrigeration cycle can be introduced into the ion exchanger. Thereby, it is possible to improve the ion exchange efficiency in the ion exchanger to improve the insulation performance of the cooling water and to improve the durability of the ion exchanger. As described above, according to the first disclosure, it is possible to provide a battery cooling system capable of suppressing an increase in size while improving the safety and cooling performance of the system.

According to the second disclosure, the second heat exchanger is arranged downstream of the first heat exchanger in the cooling water circulation circuit. The low-pressure refrigerant used for heat exchange in the second heat exchanger has a lower temperature than the air used for heat exchange in the first heat exchanger. Therefore, according to the present disclosure, the temperature of the heat medium for exchanging heat with the cooling water is sequentially lowered, so that it is possible to efficiently cool the cooling water.

According to the third disclosure, the second heat exchanger, the first heat exchanger, and the ion exchanger are arranged in this order from the upstream side of the cooling water circulation circuit. Even with such a configuration, the cooling water after being cooled using the low-pressure refrigerant of the refrigeration cycle can be introduced into the ion exchanger.

According to the fourth disclosure, the second heat exchanger, the ion exchanger, and the first heat exchanger are arranged in this order from the upstream side of the cooling water circulation circuit. Even with such a configuration, the cooling water after being cooled using the low-pressure refrigerant of the refrigeration cycle can be introduced into the ion exchanger.

According to the fifth disclosure, in the refrigeration cycle circuit, the distribution destination of the low-pressure refrigerant is switched between the air-conditioning heat exchanger and the second heat exchanger in accordance with the correlation value of the battery temperature. As a result, the amount of heat exchange in the second heat exchanger can be changed in accordance with the battery temperature, so that it is possible to suppress the overcooling and the excessive temperature rise of the battery.

According to the sixth disclosure, the outside air flowing along the vehicle can be efficiently led to the first heat exchanger.

According to the seventh disclosure, the flow destination of the cooling water flowing from the first heat exchanger can be switched between the second heat exchanger and the ion exchanger in accordance with the temperature of the cooling water flowing through the first heat exchanger. This makes it possible to improve the ion exchange efficiency and the durability of the ion exchanger according to the temperature of the introduced cooling water.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly described otherwise, or unless the present disclosure is explicitly specified by the structures, steps or the like theoretically.

1. First Embodiment

First embodiment will be described with reference to the drawings.

1-1. Configuration of First Embodiment

Figure 1:
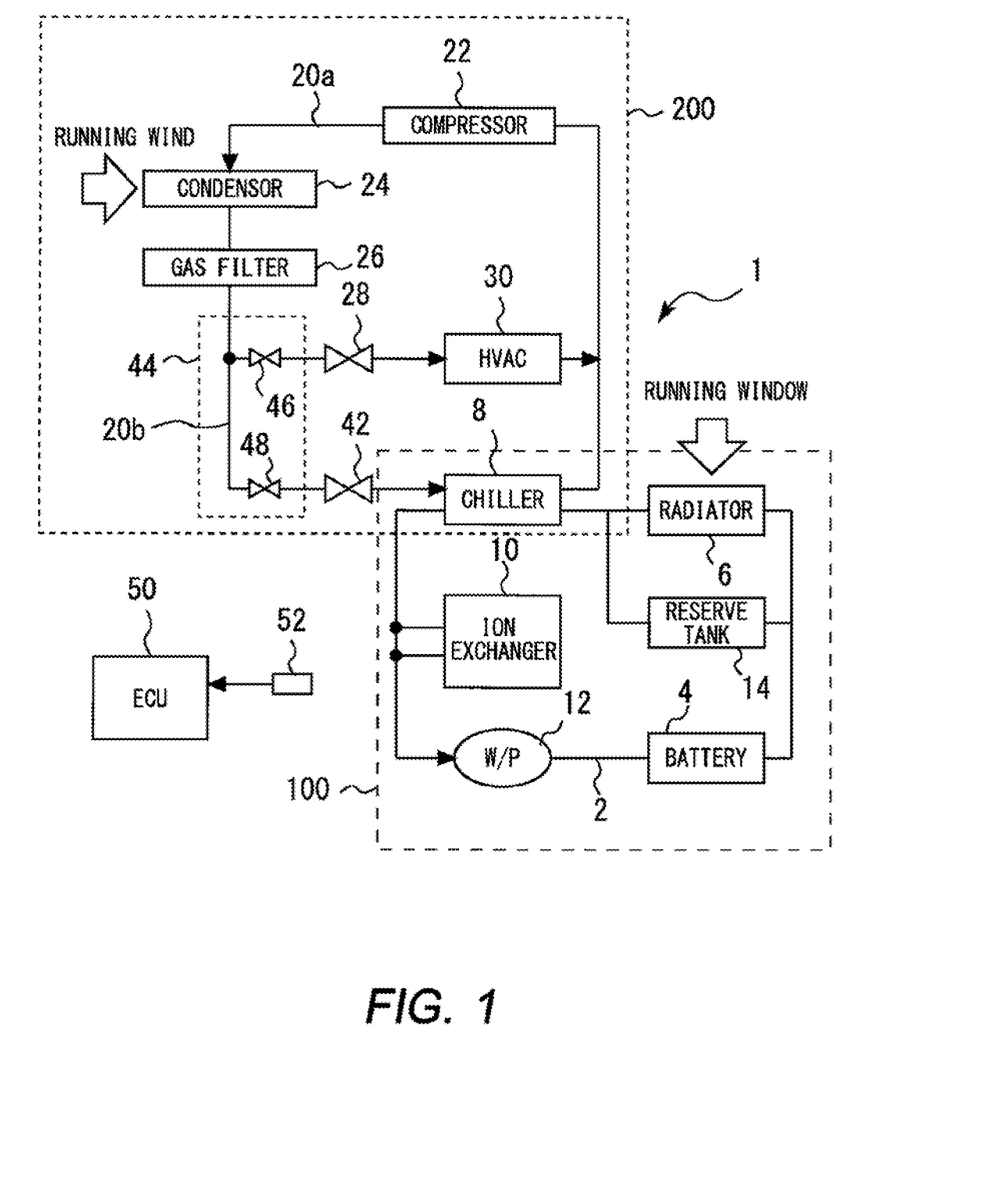
FIG. 1 is a diagram for explaining a configuration of a battery cooling system according to first embodiment.

FIG. 1 is a diagram for explaining a configuration of a battery cooling system according to first embodiment. A battery cooling system 1 of the present embodiment is mounted on a vehicle V1 which includes an electric motor for outputting torque for driving the vehicle V1, and a battery 4 for supplying electric power to the electric motor. In the first embodiment, the hybrid vehicle including the electric motor and the engine is described as an example, but an EV vehicle not including the engine or a plug-in hybrid vehicle further including an external charging function may be used.

The battery cooling system 1 is a system for cooling the battery 4 mounted on the vehicle V1. The battery 4 is configured, for example, as an assembled battery in which a plurality of unit batteries are stacked. Inside the battery 4, a cooling water passage (not shown) for circulating cooling water for cooling the battery (to be described later) is provided.

The battery cooling system 1 includes a cooling water circulation circuit 100, a refrigeration cycle circuit 200, and a control device 50. In the cooling water circulation circuit 100, a radiator 6, a chiller 8, an ion exchanger 10, and a water pump 12 are mounted as a configuration for circulating the cooling water to the cooling water passage of the battery 4. These components are annularly connected by the cooling water piping 2, thereby forming a circulation circuit of the cooling water. As the cooling water, cooling water having high insulating performance called insulating LLC is used.

The radiator 6 is a heat exchanger that cools cooling water by heat exchange with air. Hereinafter, the radiator 6 is also referred to as a first heat exchanger. The radiator 6 is disposed in the cooling water piping 2 on the downstream side of the battery 4. In the cooling water circulation circuit 100, a completely sealed reserve tank 14 is disposed in parallel with the radiator 6.

The chiller 8 is disposed in the cooling water piping 2 downstream of the radiator 6. The chiller 8 is a heat exchanger for cooling the cooling water by exchanging heat with the low-pressure refrigerant circulating in the refrigeration cycle circuit 200. Hereinafter, the chiller 8 is also referred to as a second heat exchanger. The configuration of the refrigeration cycle circuit 200 will be described later in detail.

The ion exchanger 10 is disposed in the cooling water piping 2 on the downstream side of the chiller 8. The ion exchanger 10 is an apparatus for removing impurity ions from cooling water. The ion exchanger 10 has a built-in orifice. As a result, a part of the cooling water cooled in the chiller 8 flows into the ion exchanger 10.

The water pump 12 is disposed in the cooling water piping 2 downstream of the ion exchanger 10. The water pump 12 circulates the cooling water of the cooling water circulation circuit 100 to the battery 4, the radiator 6, the chiller 8, and the ion exchanger 10 in this order.

The refrigeration cycle circuit 200 is a device having an in-vehicle air conditioning function for cooling the air in the vehicle using the refrigeration cycle, and a cooling water cooling function for cooling the cooling water using the chiller 8 described above. The refrigeration cycle circuit 200 includes a compressor 22, a condenser 24, a gas filter 26, a pressure reducing valve 28, a HVAC evaporator 30, a switching mechanism 44, a pressure reducing valve 42, and the chiller 8 as components constituting the circuit.

The refrigeration cycle circuit 200 includes a refrigerant piping 20a in which a compressor 22, a condenser 24, a gas filter 26, a pressure reducing valve 28, and a HVAC evaporator 30 are annularly connected. The compressor 22 compresses the low-pressure refrigerant gas. The kind of the refrigerant is not particularly limited. In the refrigeration cycle circuit 200 of the first embodiment, for example, a refrigerant such as HFC134a may be used.

The condenser 24 is an example of a condenser that exchanges heat between the high-temperature high-pressure refrigerant discharged from the compressor 22 and air (i.e. running wind). The high-pressure refrigerant passing through the condenser 24 passes through the gas filter 26. The gas filter 26 filters out impurities contained in the refrigerant.

The pressure reducing valve 28 is an example of a pressure reducing device that reduces the pressure of the high-pressure refrigerant that has passed through the condenser 24 and the gas filter 26 to a low-pressure refrigerant. The pressure reducing valve 28 is configured as, for example, an electronically controlled expansion valve or the like capable of varying the opening degree. The decompressed low-pressure refrigerant is in a gas-liquid two-phase state. The HVAC evaporator 30 is a heat exchanger that exchanges heat between the low-pressure refrigerant decompressed by the pressure reducing valve 28 and the outside air. In the HVAC evaporator 30, the low-pressure refrigerant evaporates by absorbing heat of the outside air. A blower fan (not shown) blows air so that the outside air is supplied into the vehicle compartment through the HVAC evaporator 30. That is, the HVAC evaporator 30 functions as a heat exchanger for air conditioning of vehicles. The low-pressure refrigerant gas evaporated in the HVAC evaporator 30 is sucked into the compressor 22.

The refrigeration cycle circuit 200 includes a refrigerant piping 20b that joins the refrigerant piping 20a while bypassing the pressure reducing valve 28 and the HVAC evaporator 30. In the refrigerant piping 20b, the pressure reducing valve 42 and the chiller 8 described above are arranged in series in this order from the upstream side. The pressure reducing valve 42 has the same structure as the pressure reducing valve 28. The decompressed low-pressure refrigerant is in a gas-liquid two-phase state. The chiller 8 is a heat exchanger for exchanging heat between the low-pressure refrigerant decompressed by the pressure reducing valve 28 and the cooling water passing through the radiator 6. The low-pressure refrigerant evaporates by absorbing heat of the cooling water in the chiller 8. The low-pressure refrigerant gas evaporated in the chiller 8 is sucked into the compressor 22.

The refrigeration cycle circuit 200 is provided with a switching mechanism 44. The switching mechanism 44 functions as a flow path switching mechanism that switches the flow destination of the refrigerant that has passed through the condenser 24 and the gas filter 26 between the side of the pressure reducing valve 28 and the side of the pressure reducing valve 42. Specifically, the switching mechanism 44 includes on-off valves 46 and 48 for switching the distribution and shutoff of the refrigerant flowing through the piping. The on-off valve 46 is disposed on the downstream side of a branch portion to the refrigerant piping 20b in the refrigerant piping 20a and on the upstream side of the pressure reducing valve 28. Further, the on-off valve 48 is disposed on the upstream side of the pressure reducing valve 42 in the refrigerant piping 20b.

The switching mechanism 44 switches the flow path form of the refrigerant flowing through the refrigeration cycle circuit 200 by switching the open/closed states of the on-off valves 46 and 48. Specifically, the switching mechanism 44 switches between a first flow path form in which the on-off valve 46 is opened and the on-off valve 48 is closed, and a second flow path form in which the on-off valve 46 is closed and the on-off valve 48 is opened.

The battery cooling system 1 according to the present embodiment is provided with a control device 50. The control device 50 is also referred to as an ECU (Electronic Control Unit) 50. The ECU 50 is a control device for comprehensively controlling the entire battery cooling system 1, and the control device according to the present disclosure is embodied as one function of the ECU 50.

The ECU 50 includes at least input/output interface, ROM, RAM, and CPU. The input/output interface takes in a signal of a sensor included in the battery cooling system 1, and outputs an operation signal to an actuator included in the battery cooling system 1. Sensors are attached to the battery cooling system 1 at various locations. For example, the battery 4 is provided with a temperature sensor 52 for detecting the battery temperature Tb. The ECU 50 processes the captured signals of the respective sensors and operates the respective actuators according to predetermined control programs. Actuators operated by the ECU 50 include the water pump 12, the switching mechanism 44, and the compressor 22. In the ROM, various control data including various control programs and maps for controlling the battery cooling system 1 are stored. The CPU reads out the control program from the ROM and executes it, and generates an operation signal based on the captured sensor signal. There are many actuators and sensors connected to the ECU 50 other than those shown in the drawing, but descriptions thereof are omitted in the present specification.

1-2. Characteristics of Battery Cooling System of First Embodiment

Next, features of the battery cooling system 1 of the first embodiment will be described. The battery cooling system 1 of the first embodiment is characterized in that the degree of cooling of the battery may be adjusted according to the heat generation amount by the battery 4. That is, the vehicle on which the battery cooling system 1 of the first embodiment is mounted is configured to be capable of selecting a plurality of driving modes having different output modes of the battery 4. The plurality of driving modes include an urban driving mode assuming normal driving on a general road and a sports driving mode assuming high-speed driving on a circuit. These modes are configured so that the driver can manually set them.

In the sports driving mode, the heat generation amount by the battery 4 greatly increases compared with the urban driving mode. Therefore, in the battery cooling system 1 of the first embodiment, the flow path form of the refrigeration cycle circuit 200 is switched according to the driving mode. The operation of the battery cooling system 1 in each driving mode will be described below.

1-2-1. Urban Driving Mode

Figure 2:
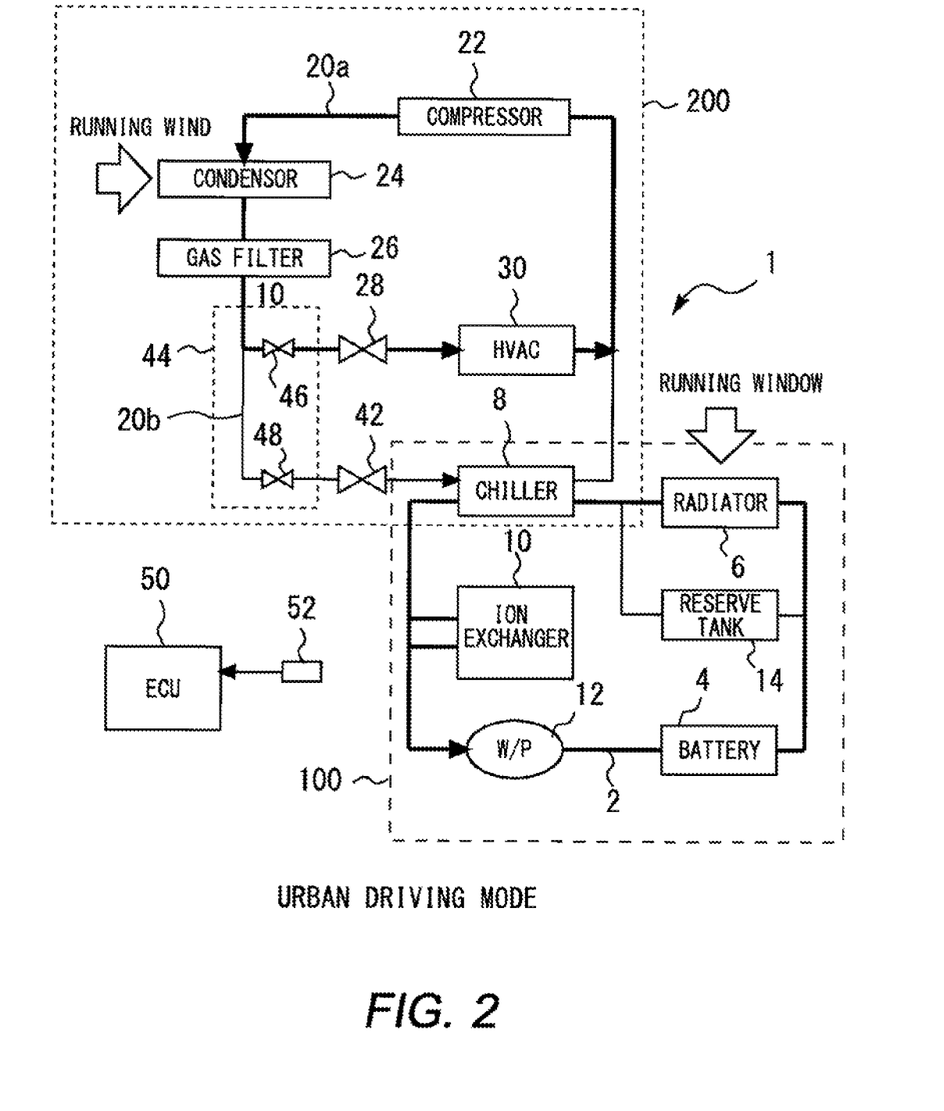
FIG. 2 is a diagram for explaining an operation of the battery cooling system in an urban driving mode.

FIG. 2 is a diagram for explaining an operation of the battery cooling system in the urban driving mode. As shown in FIG. 2, when the urban driving mode is selected as the driving mode, the ECU 50 operates the switching mechanism 44 so that the first flow path mode is selected. As a result, the refrigeration cycle circuit 200 drives the compressor 22 to form a refrigeration cycle in which the refrigerant flows in the order of the compressor 22, the condenser 24, the pressure reducing valve 28, and the HVAC evaporator 30. Therefore, in the urban driving mode, the in-vehicle air conditioning function for cooling the in-vehicle air in the HVAC evaporator 30 is realized.

On the other hand, in the cooling water circulation circuit 100, a cooling water circuit is formed that flows through the cooling water circulation circuit 100 that continues from the water pump 12 to the battery 4, the radiator 6, the chiller 8, and the ion exchanger 10. According to such a circuit configuration of the cooling water circulation circuit 100 and the refrigeration cycle circuit 200, the cooling water that absorbs the heat generated by the battery 4 is cooled mainly by heat exchange with air in the radiator 6.

1-2-2. Sports Driving Mode

Figure 3:
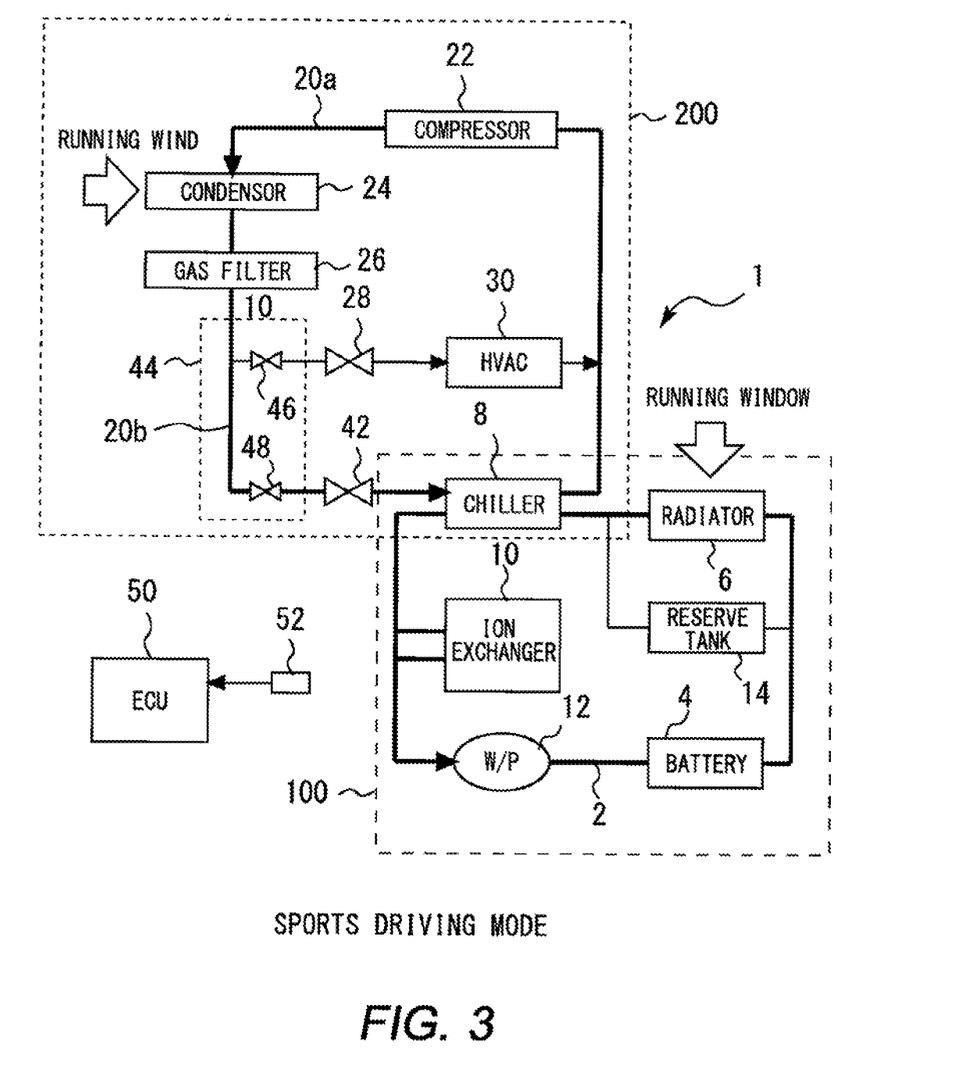
FIG. 3 is a diagram for explaining an operation of the battery cooling system in a sports driving mode.

FIG. 3 is a diagram for explaining an operation of the battery cooling system in the sports driving mode. As shown in FIG. 3, when the sport driving mode is selected as the driving mode, the ECU 50 operates the switching mechanism 44 so that the second flow path form is selected. As a result, in the refrigeration cycle circuit 200, the compressor 22 is driven to form a refrigeration cycle in which the refrigerant flows in the order of the compressor 22, the condenser 24, the pressure reducing valve 42, and the chiller 8. Therefore, in the sports driving mode, a cooling water cooling function for cooling the cooling water in the chiller 8 is realized.

On the other hand, in the cooling water circulation circuit 100, a cooling water circuit is formed that flows through the cooling water circulation circuit 100 that continues from the water pump 12 to the battery 4, the radiator 6, the chiller 8, and the ion exchanger 10. According to the circuit configuration of the cooling water circulation circuit 100 and the refrigeration cycle circuit 200, the cooling water that absorbs the heat generated by the battery 4 is cooled by heat exchange with air in the radiator 6 and heat exchange with the refrigerant in the chiller 8. This makes it possible to improve the cooling performance as compared with the case where the cooling water is cooled only by heat exchange in the radiator 6.

As described above, in the battery cooling system 1 of the first embodiment, the chiller 8 of the refrigeration cycle circuit 200 can be used in combination according to the heat generation amount by the battery 4. This makes it possible to suppress the increase in size of the radiator 6 while improving the cooling performance.

1-2-3. Ion Exchanger

The battery cooling system 1 of the first embodiment is also characterized by the configuration of the ion exchanger 10. That is, the battery cooling system 1 uses insulating LLC as cooling water. This ensures safety when the battery 4 is cooled using the cooling water. However, the conductivity of the insulating LLC gradually increases by thermal degradation due to use. Therefore, in the battery cooling system 1 of the first embodiment, the ion exchanger 10 is disposed downstream of the chiller 8 in the cooling water circulation circuit 100. The ion exchanger 10 has a function of removing impurity ions in the insulating LLC by ion exchange. The insulating LLC flowing through the cooling water circulation circuit 100 is introduced into the ion exchanger 10 to remove impurity ions. As a result, the insulating performance of the insulating LLC can be maintained.

The ion exchange efficiency of the ion exchanger 10 depends on the temperature. Specifically, it is known that the ion exchange efficiency is greatly reduced when the temperature of the insulating LLC introduced into the ion exchanger 10 exceeds 73° C. Therefore, in the battery cooling system 1 of the first embodiment, the ion exchanger 10 is disposed downstream of the chiller 8 in the cooling water circulation circuit 100. The radiator 6 exchanges heat between the running wind (i.e. air) and the cooling water, while the chiller 8 exchanges heat between the low-pressure refrigerant and the cooling water at a lower temperature than the running wind (i.e. air). Therefore, the cooling water that has passed through the chiller 8 has a lower temperature than the cooling water that has passed through the radiator 6. This makes it possible to lower the temperature of the cooling water introduced into the ion exchanger 10, thereby making it possible to improve durability while suppressing a decrease in ion exchange efficiency in the ion exchanger 10.

1-3. In-Vehicle Structure of Battery Cooling System of First Embodiment

Figure 4:
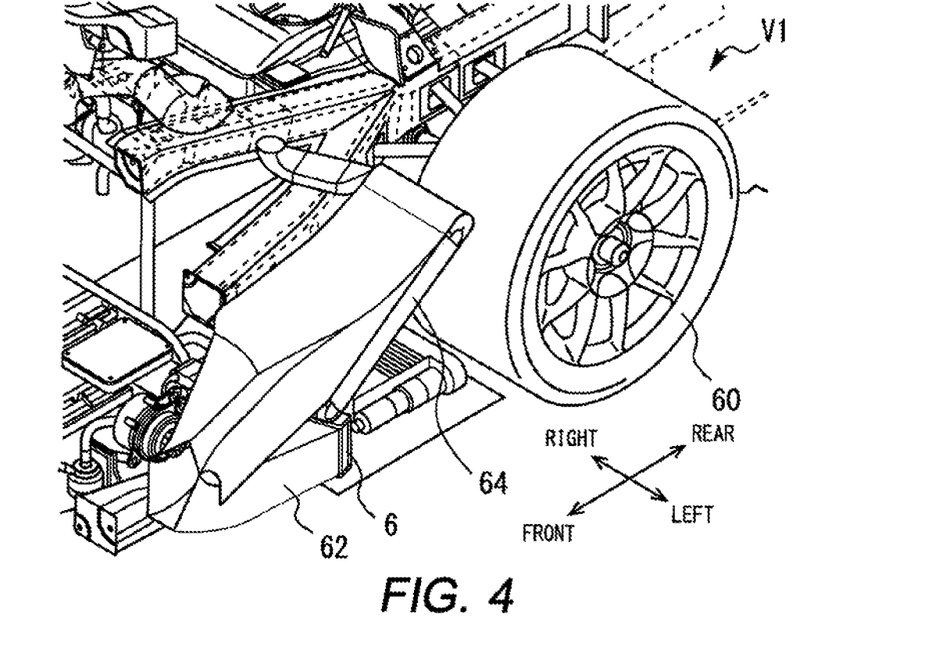
FIG. 4 is a schematic view of an internal structure around a left rear wheel of a vehicle on which the battery cooling system is mounted, as viewed from the left front.

The battery cooling system 1 of the first embodiment is also characterized by an in-vehicle structure of the battery cooling system 1. FIG. 4 is a schematic view of an internal structure around a left rear wheel of the vehicle on which the battery cooling system 1 is mounted, as seen from the left front side. As shown in FIG. 4, a duct 62 for rectifying and taking in the outside air is provided in a space that extends forward in the traveling direction of the left rear wheel 60 of the vehicle V1. The inlet side of the duct 62 is open to the outside, and the outlet side is branched into two upper and lower parts. An intercooler 64, which is a component of the engine of the vehicle V1, is disposed at the outlet of the upper side of the duct 62. The above-mentioned radiator 6 is disposed at the outlet on the lower side of the duct 62.

Figure 5:
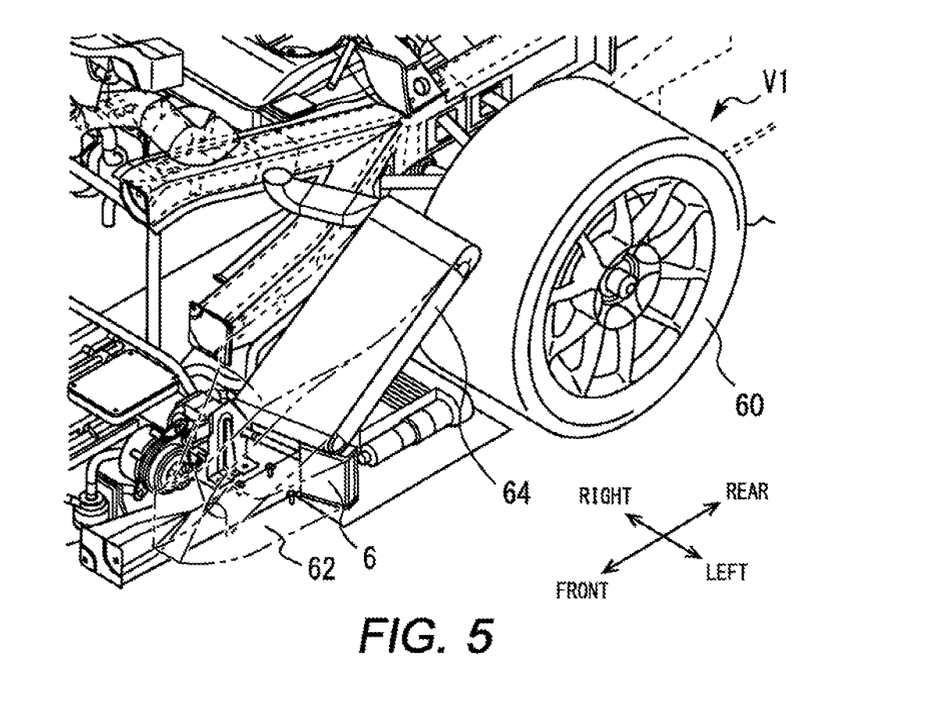
FIG. 5 is a schematic view of the internal structure around the left rear wheel of the vehicle on which the battery cooling system is mounted, as viewed from the left side.
Figure 6:
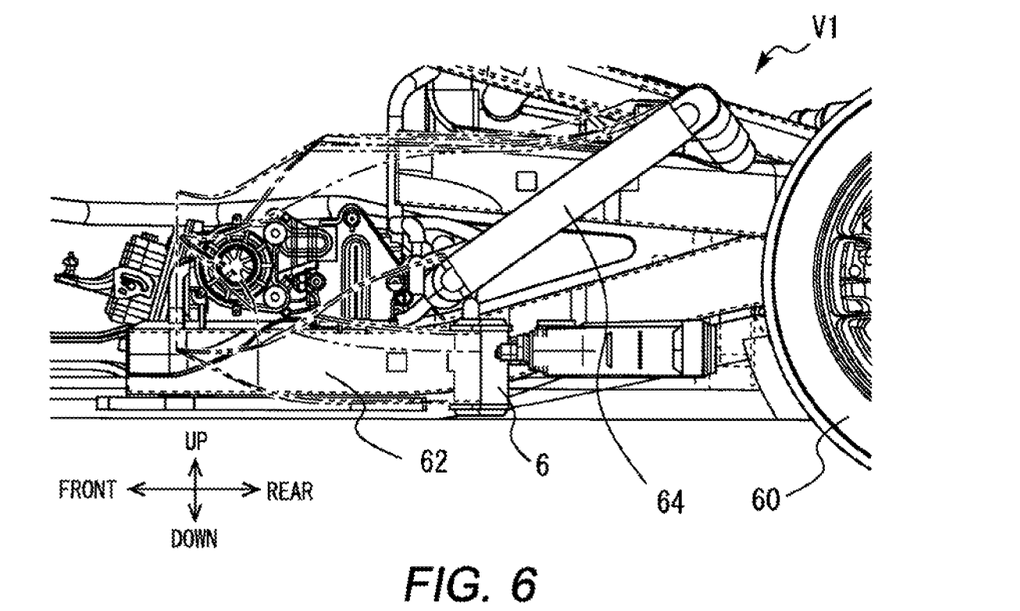
FIG. 6 is a schematic view of the internal structure around the left rear wheel of the vehicle on which the battery cooling system is mounted, as seen from the left front.
Figure 7:
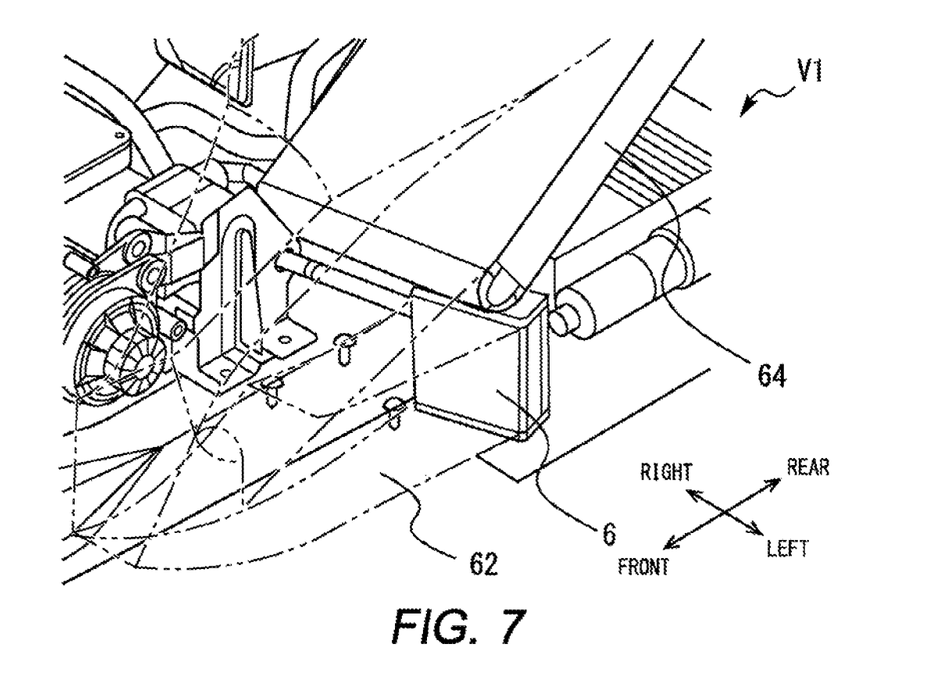
FIG. 7 is an enlarged view showing a periphery of a radiator, which is a main part of FIG. 5.

FIG. 5 is a schematic view of the internal structure around the left rear wheel of the vehicle on which the battery cooling system 1 is mounted, as viewed from the left side. FIG. 6 is a schematic view of the internal structure around the left rear wheel of the vehicle on which the battery cooling system 1 is mounted, as viewed from the left front side. FIG. 7 is an enlarged view showing a periphery of the radiator which is a main part of FIG. 5. In FIG. 5 to FIG. 7, the duct 62 shown in FIG. 4 is shown by a two-dot chain line in perspective. As shown in these figures, the radiator 6 is disposed in the space on the front side of the left rear wheel 60 from the vehicle V1 in a direction facing the traveling direction, that is, vertically. According to such a configuration, outside air flowing along the side surface of the vehicle V1 is guided to the radiator 6 through the duct 62. This makes it possible to improve the efficiency of heat exchange with air in the radiator 6.

Figure 8:
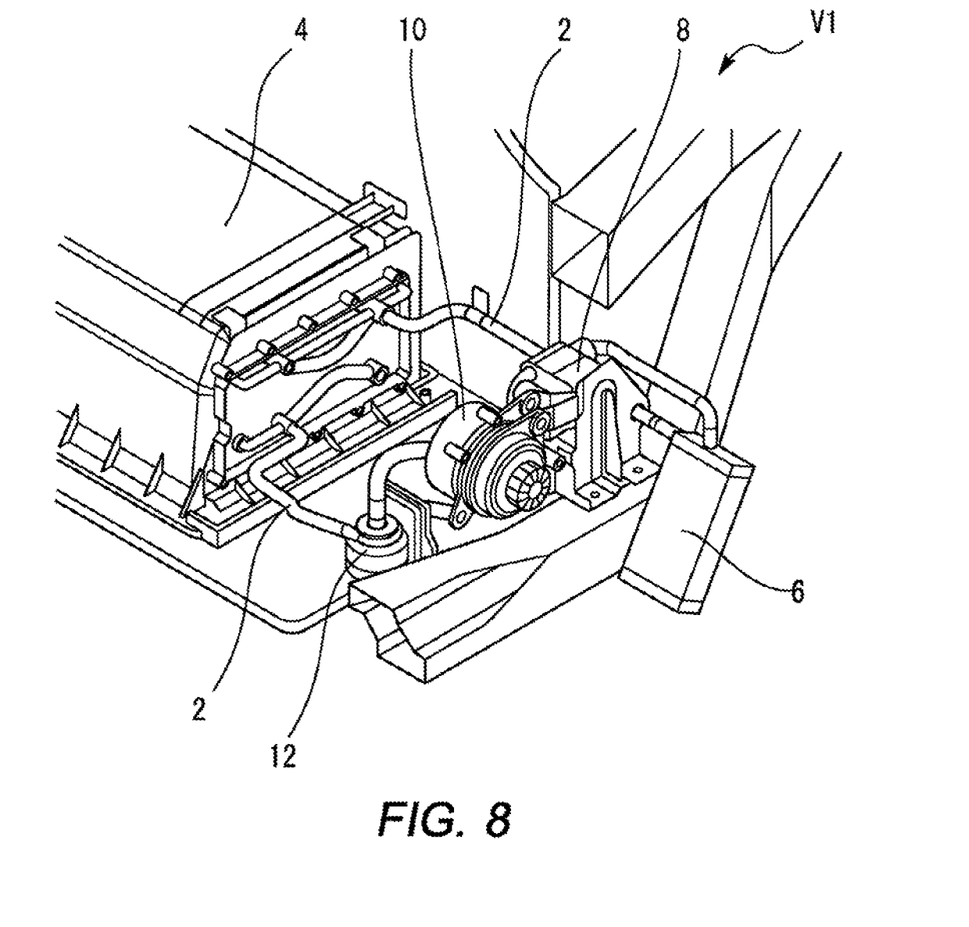
FIG. 8 is a schematic diagram showing an arrangement structure of main components of the battery cooling system mounted on the vehicle, as viewed from the left front side of the vehicle.
Figure 9:
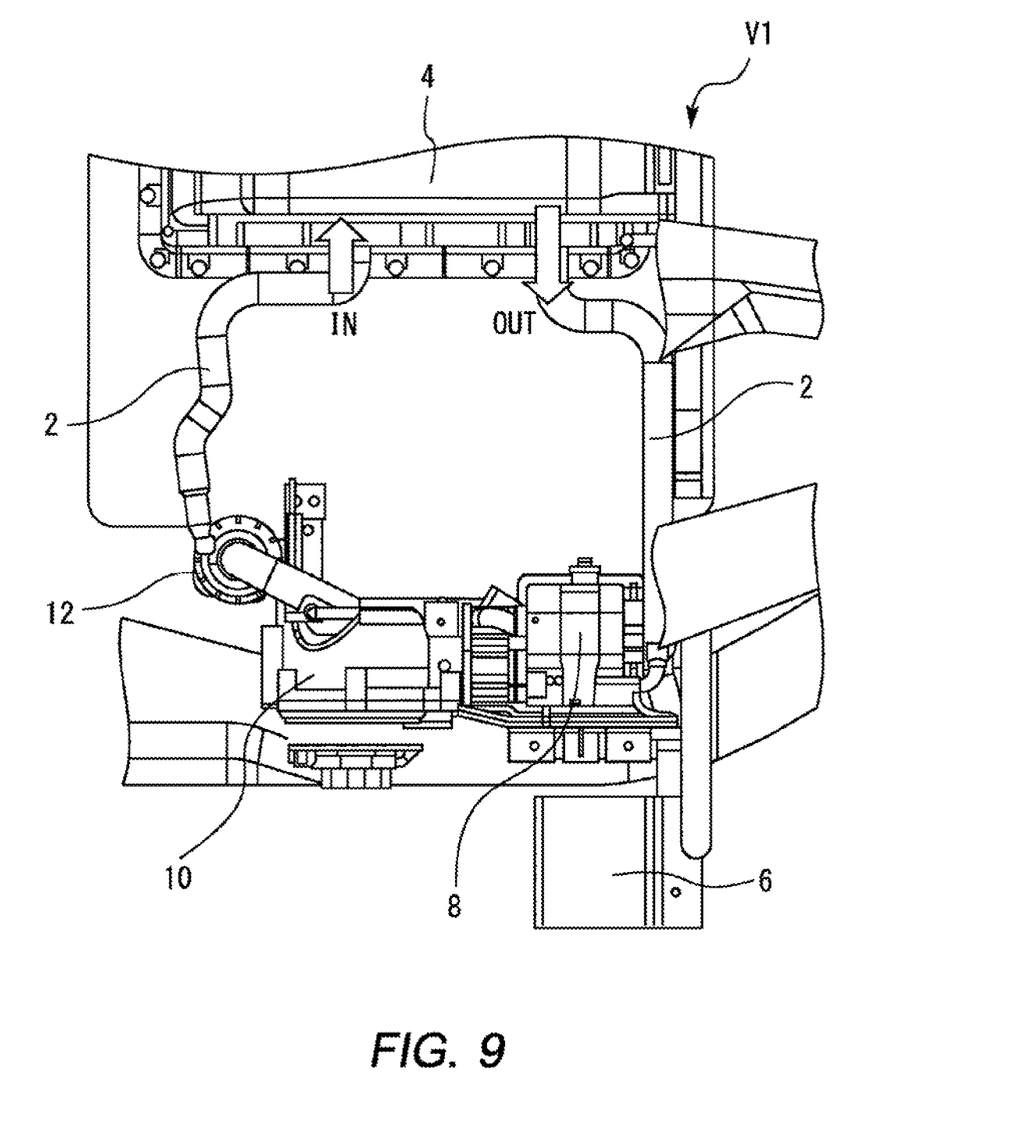
FIG. 9 is a schematic diagram showing the arrangement structure of the main components of the battery cooling system mounted on the vehicle, as seen from above the vehicle.

FIG. 8 is a schematic view of the arrangement structure of the main components of the battery cooling system mounted on the vehicle, as seen from the left front side of the vehicle. FIG. 9 is a schematic view of the arrangement structure of the main components of the battery cooling system mounted on the vehicle, as viewed from above the vehicle. As shown in these figures, the ion exchanger 10, the water pump 12, the chiller 8, and the radiator 6, which constitute the cooling water circulation circuit 100, are disposed close to the side of the battery 4. This makes it possible to shorten the pipe length of the cooling water piping 2, thereby making it possible to achieve a compact system.

1-4. Modification of Battery Cooling System of First Embodiment

The battery cooling system 1 of the first embodiment may adopt a modified form as follows.

The switching of the switching mechanism 44 is not limited to a method of switching in accordance with the driving mode. That is, the switching of the switching mechanism 44 may be performed in accordance with the temperature of the battery 4. In this instance, the ECU 50 determines whether or not the battery temperature Tb detected by the temperature sensor 52 is greater than a predetermined temperature Tth1. The predetermined temperature Tth1 is a threshold value of the battery temperature at which cooling of the cooling water using the chiller 8 is required. In the battery cooling system 1 of the first embodiment, it is preferable to cool the cooling water so that the return temperature of the cooling water introduced into the battery 4 becomes 60° C. or less. The predetermined temperature Tth1 may be, for example, the battery temperature when the return temperature exceeds 60° C., in the case where the cooling water is cooled only by the radiator 6.

When the battery temperature Tb is equal to or lower than the predetermined temperature Tth1, the ECU 50 controls the switching mechanism 44 so that the battery temperature Tb is in the first flow path form. On the other hand, when the battery temperature Tb is larger than the predetermined temperature Tth1, the ECU 50 controls the switching mechanism 44 so that the battery temperature Tb is in the second flow path form. According to the operation of the switching mechanism 44, since the flow path form can be switched according to the temperature of the battery 4, it is possible to perform cooling according to the heat generation amount by the battery 4.

The switching mechanism 44 may be switched using a correlation value correlated with the temperature of the battery 4. For example, the temperature of the cooling water, the load of the battery 4, the vehicle speed, and the like can be used as the correlation value.

When the vehicle V1 is a plug-in vehicle capable of being externally charged, the switching mechanism 44 may be switched according to the state of charge. That is, while the battery 4 is rapidly charged, the heat generation amount by the battery 4 increases. Therefore, the ECU 50 may be configured to activate the refrigeration cycle circuit 200 and switch the switching mechanism 44 to the second flow path mode when detecting that the rapid charge of the vehicle V1 is started. This makes it possible to effectively suppress overheating of the battery 4 at the time of rapid charging.

The switching mechanism 44 is not limited to the configuration of the on-off valves 46 and 48. That is, the switching mechanism 44 may have a configuration in which a three-way valve is disposed at a branch portion between the refrigerant piping 20a and the refrigerant piping 20b to switch between the first flow path mode and the second flow path mode.

The switching mechanism 44 may circulate the refrigerant also in the first flow path configuration while the second flow path configuration is realized. In this instance, the ECU 50 may adjust the ratio of the refrigerant circulating in the second flow path form and the refrigerant circulating in the first flow path form according to the battery temperature Tb.

In the battery cooling system 1 of the first embodiment, the configuration of the refrigeration cycle circuit 200 is not limited. That is, as long as the low-pressure refrigerant of the refrigeration cycle circuit may be introduced into the chiller 8, the configuration of the switching mechanism 44 is not necessarily provided.

2. Second Embodiment

Next, a battery cooling system according to a second embodiment will be described.

2-1. Features of Battery Cooling System According to Second Embodiment

Figure 10:
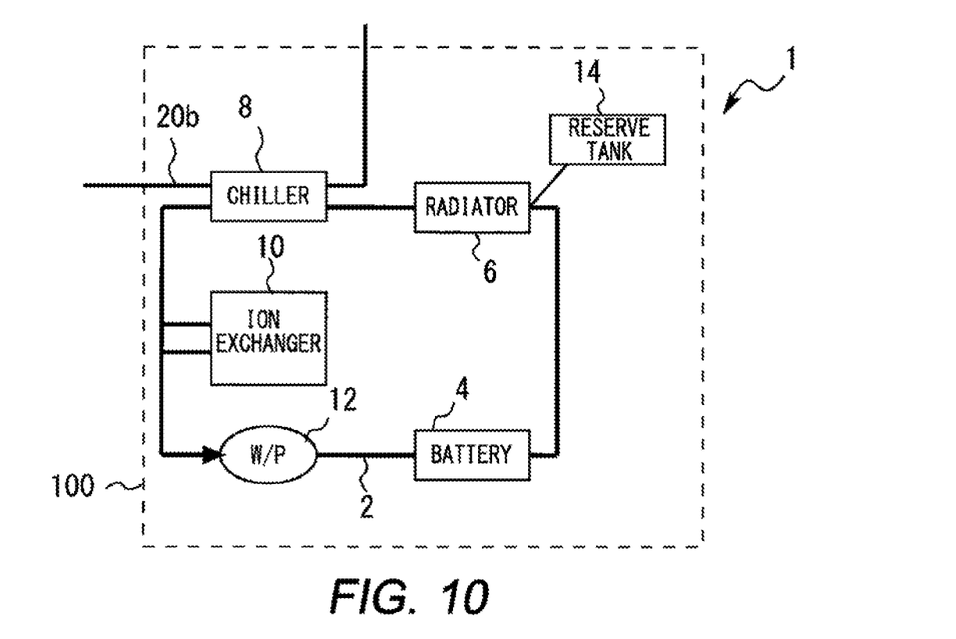
FIG. 10 is a diagram for explaining a configuration of a cooling water circulation circuit included in the battery cooling system of second embodiment.

FIG. 10 is a diagram for explaining a configuration of a cooling water circulation circuit included in the battery cooling system according to the second embodiment. Note that a refrigeration cycle circuit included in the battery cooling system 1 of the second embodiment is the same as the refrigeration cycle circuit 200 included in the battery cooling system 1 of Embodiment 1. The cooling water circulation circuit 100 of the second embodiment has the same configuration as that of the cooling water circulation circuit 100 of the first embodiment, except for a structure in which the reserve tank 14 is configured as a simple sealed type. As described above, according to the battery cooling system 1 of the second embodiment, the configuration of the reserve tank 14 may be further simplified. In addition, according to the battery cooling system 1 of the second embodiment, it is possible to achieve the same effect as the battery cooling system 1 of the first embodiment.

3. Third Embodiment

Next, a battery cooling system of a third embodiment will be described.

3-1. Features of Battery Cooling System According to Third Embodiment

Figure 11:
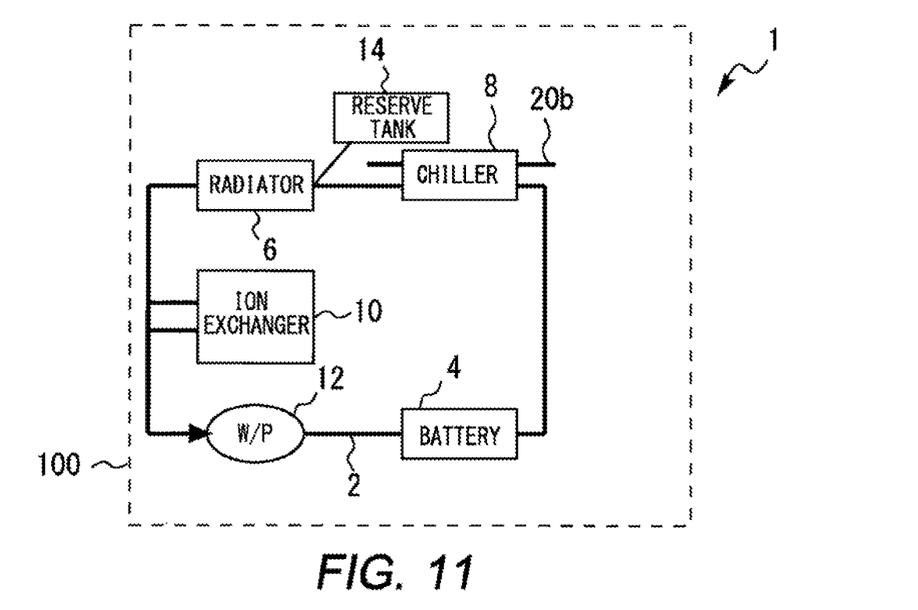
FIG. 11 is a diagram for explaining a configuration of the cooling water circulation circuit included in the battery cooling system according to third embodiment.

FIG. 11 is a diagram for explaining a configuration of a cooling water circulation circuit included in the battery cooling system of the third embodiment. Note that a refrigeration cycle circuit included in the battery cooling system 1 of the third embodiment is the same as the refrigeration cycle circuit 200 included in the battery cooling system 1 of the first embodiment. The cooling water circulation circuit 100 of the third embodiment has the same configuration as the cooling water circulation circuit 100 of the second embodiment except for the structure in which the chiller 8 is disposed on the upstream side of the radiator 6.

According to the battery cooling system 1 of the third embodiment, cooling water flows in the order of the chiller 8, the radiator 6, and the ion exchanger 10. Compared with the battery cooling system 1 of the first embodiment, the distribution order of the chiller 8 and the radiator 6 is different, but the chiller 8 is on the upstream side of the ion exchanger 10 in common. That is, according to the battery cooling system 1 of the third embodiment, since the cooling water cooled in the chiller 8 may be introduced into the ion exchanger 10, it is possible to improve the ion exchange efficiency and the durability of the ion exchanger 10, similarly to the battery cooling system 1 of the first embodiment.

4. Fourth Embodiment

Next, a battery cooling system of a fourth embodiment will be described.

4-1. Features of Battery Cooling System According to Fourth Embodiment

Figure 12:
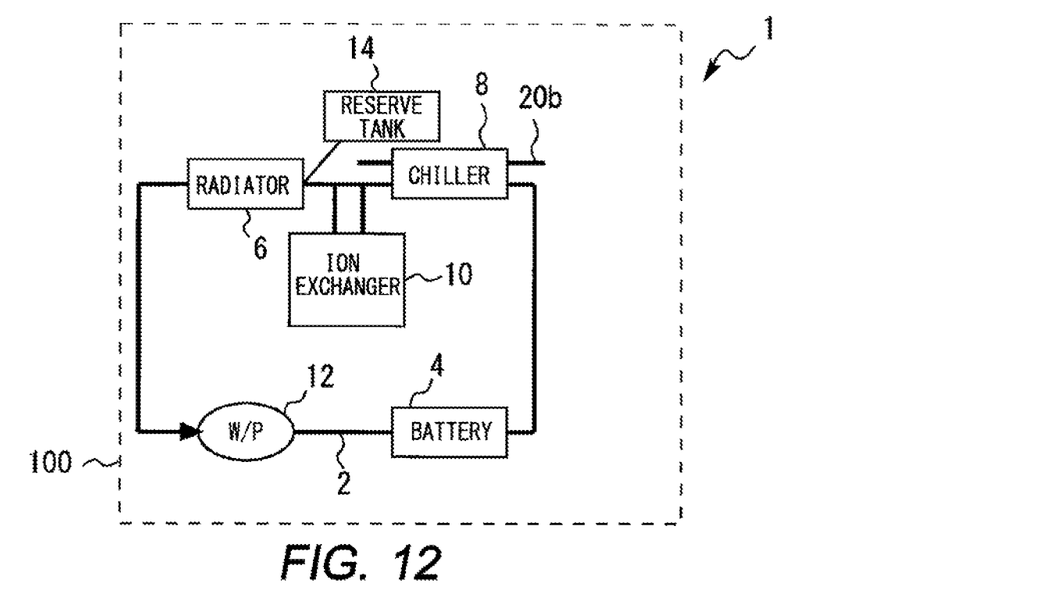
FIG. 12 is a diagram for explaining a configuration of the cooling water circulation circuit included in the battery cooling system according to fourth embodiment.

FIG. 12 is a diagram for explaining a configuration of a cooling water circulation circuit included in the battery cooling system of the fourth embodiment. Note that a refrigeration cycle circuit included in the battery cooling system 1 of the fourth embodiment is the same as the refrigeration cycle circuit 200 included in the battery cooling system 1 of the first embodiment. The cooling water circulating circuit 100 of the fourth embodiment has the same configuration as the cooling water circulating circuit 100 of the third embodiment except for a structure in which the ion exchanger 10 is disposed at a position on the downstream side of the chiller 8 and on the upstream side of the radiator 6.

According to the battery cooling system 1 of the fourth embodiment, cooling water is circulated in the order of the chiller 8, the ion exchanger 10, and the radiator 6. Compared with the battery cooling system 1 of the first embodiment, the distribution sequence of the radiator 6 and the ion exchanger 10 is different, but the chiller 8 is on the upstream side of the ion exchanger 10 in common. That is, according to the battery cooling system 1 of the fourth embodiment, since the cooling water cooled in the chiller 8 may be introduced into the ion exchanger 10, it is possible to improve the ion exchange efficiency and the durability of the ion exchanger 10, similarly to the battery cooling system 1 of the first embodiment.

5. Fifth Embodiment

Next, a battery cooling system of a fifth embodiment will be described.

5-1. Features of Battery Cooling System According to Fifth Embodiment

Figure 13:
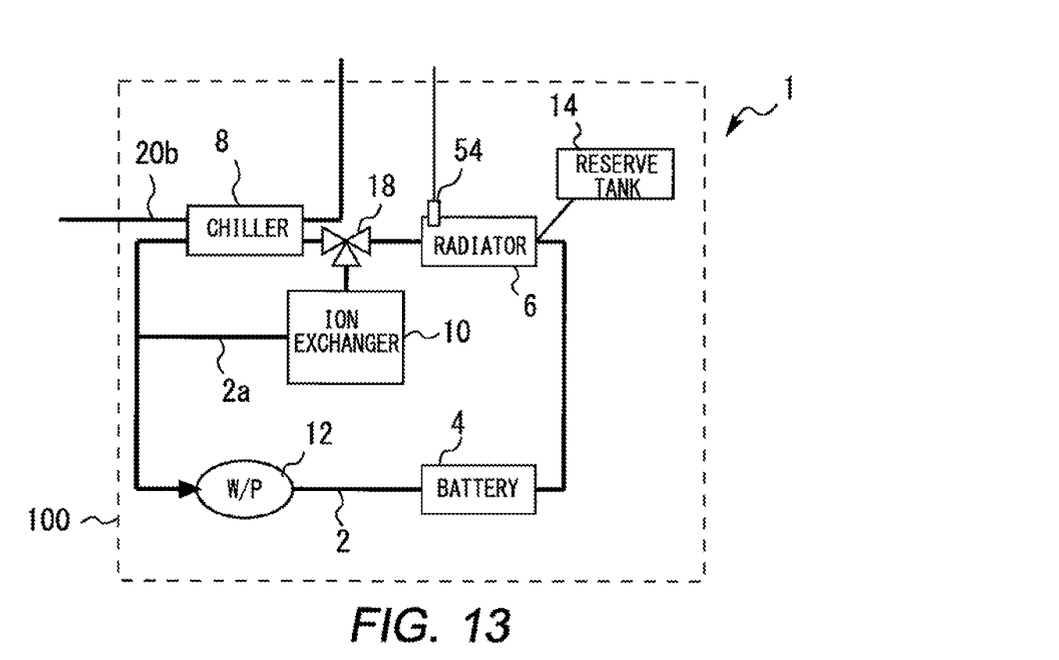
FIG. 13 is a diagram for explaining a configuration of the cooling water circulation circuit included in the battery cooling system according to fifth embodiment.

FIG. 13 is a diagram for explaining a configuration of a cooling water circulation circuit included in the battery cooling system of the fifth embodiment. Note that a refrigeration cycle circuit included in the battery cooling system 1 of the fifth embodiment is the same as the refrigeration cycle circuit 200 included in the battery cooling system 1 of the first embodiment. The cooling water circulation circuit 100 of the fifth embodiment includes a cooling water piping 2a as a branch passage which branches from the cooling water piping 2 downstream of the radiator 6 and bypasses the chiller 8. The ion exchanger 10 is disposed in the midway of the cooling water piping 2a. A switching valve 18 serving as a switching device for cooling water for switching the destination of cooling water flowing from the radiator 6 between the chiller 8 side and the ion exchanger 10 side is disposed at a branch portion of the cooling water piping 2 and the cooling water piping 2a. As the switching valve 18, for example, a rotary valve or the like may be employed. The radiator 6 is provided with a temperature sensor 54 for detecting an outlet temperature Tout of the cooling water flowing out of the radiator 6. The rest of the structure of the battery cooling system 1 of the fifth embodiment is the same as the structure of the cooling water circulation circuit 100 of the second embodiment.

As described above, when high-temperature cooling water is introduced into the ion exchanger 10, deterioration in ion exchange efficiency and durability become problems. Therefore, in the battery cooling system 1 of the fifth embodiment, the cooling water is introduced into the ion exchanger 10 only when the outlet temperature Tout of the cooling water flowing out from the radiator 6 is lower than a predetermined determination temperature. Specifically, the ECU 50 determines whether or not the outlet temperature Tout of the cooling water detected by the temperature sensor 54 is larger than a predetermined temperature Tth2. The predetermined temperature Tth2 is a threshold value of the temperature of cooling water determined from the durability of the ion exchanger 10 and the ion exchange performance. In the battery cooling system 1 of the fifth embodiment, it is preferable to cool the cooling water so that the temperature of the cooling water introduced into the ion exchanger 10 becomes 73° C. or less. The predetermined temperature Tth2 may be set to any value of, for example, 73° C. or less.

When the outlet temperature Tout of the cooling water is equal to or lower than the predetermined temperature Tth2, the ECU 50 controls the switching valve 18 such that the cooling water is introduced into the ion exchanger 10. On the other hand, when the outlet temperature Tout of the cooling water is larger than the predetermined temperature Tth2, the ECU 50 controls the switching valve 18 such that the cooling water is introduced into the chiller 8. According to the operation of the switching valve 18, it is possible to switch the introduction and cut-off of the cooling water to the ion exchanger 10 in accordance with the temperature of the cooling water. This makes it possible to improve the ion exchange efficiency and the durability of the ion exchanger 10 even when the ion exchanger 10 is not located downstream of the chiller 8.

5-2. Modification of Battery Cooling System of Fifth Embodiment

The battery cooling system 1 of the fifth embodiment may adopt a modified form as described below.

The cooling water piping 2a may be configured to return to the cooling water piping 2 on the upstream side of the chiller 8 without bypassing the chiller 8. The configuration of the switching valve 18 as the cooling water switching mechanism is not limited. For example, the switching valve 18 may be a thermostat whose flow path is switched at a predetermined temperature.

What is claimed is:

1. A battery cooling system for cooling a battery mounted on a vehicle, the system comprising:
    a cooling water circulating circuit for circulating cooling water for cooling the battery;
    a first heat exchanger for exchanging heat between air and the cooling water;
    a second heat exchanger for exchanging heat between low-pressure refrigerant of a refrigeration cycle circuit and the cooling water, the first heat exchanger and the second heat exchanger being arranged in series in the cooling water circulation circuit; and
    an ion exchanger for removing impurity ions contained in the cooling water, the ion exchanger being disposed downstream of the second heat exchanger in the cooling water circulation circuit.

2. The battery cooling system according to claim 1, wherein the second heat exchanger is disposed downstream of the first heat exchanger in the cooling water circulation circuit.

3. The battery cooling system according to claim 1, wherein the first heat exchanger is disposed downstream of the second heat exchanger in the cooling water circulation circuit, and
    wherein the ion exchanger is disposed downstream of the first heat exchanger in the cooling water circulation circuit.

4. The battery cooling system according to claim 1, wherein the first heat exchanger is disposed downstream of the second heat exchanger in the cooling water circulation circuit, and
    wherein the ion exchanger is disposed upstream of the first heat exchanger in the cooling water circulation circuit.

5. The battery cooling system according to claim 1, wherein the refrigeration cycle circuit includes:
    a first flow path form for circulating the low-pressure refrigerant to a heat exchanger for air conditioning of the vehicle;
    a second flow path form for circulating the low-pressure refrigerant to the second heat exchanger; and
    a switching mechanism for switching between the first flow path form and the second flow path form according to a correlation value correlated with a temperature of the battery.

6. The battery cooling system according to claim 1, wherein the first heat exchanger is disposed so as to face a traveling direction of the vehicle in a space extending from a rear wheel of the vehicle to a front side of the traveling direction, and
    wherein a duct is provided for taking in outside air and leading the outside air to the first heat exchanger.

7. A battery cooling system for cooling a battery mounted on a vehicle, the system comprising:
    a cooling water circulation circuit for circulating cooling water for cooling the battery;
    a first heat exchanger for exchanging heat between air and the cooling water;
    a second heat exchanger for exchanging heat between low-pressure refrigerant of a refrigeration cycle circuit and the cooling water, the first heat exchanger and the second heat exchanger being arranged in series in the cooling water circulation circuit and the second heat exchanger being disposed downstream of the first heat exchanger in the cooling water circulation circuit; and
    an ion exchanger for removing impurity ions contained in the cooling water, the ion exchanger being disposed in a branch passage branched from the cooling water circulation circuit between the first heat exchanger and the second heat exchanger,
    wherein the cooling water circulation circuit includes a cooling water switching mechanism for switching a flow destination of the cooling water distribution from the first heat exchanger between the second heat exchanger and the ion exchanger in accordance with a temperature of the cooling water circulating through the first heat exchanger.

\* \* \* \* \*